(12) United States Patent
Dugas

(10) Patent No.: US 8,707,821 B2
(45) Date of Patent: Apr. 29, 2014

(54) CONTAINMENT REINFORCED FLYWHEEL

(76) Inventor: Patrick J Dugas, Winter Haven, FL (US)

(*) Notice: Subject to any disclaimer, the term of this patent is extended or adjusted under 35 U.S.C. 154(b) by 866 days.

(21) Appl. No.: 12/548,107

(22) Filed: Aug. 26, 2009

(65) Prior Publication Data

US 2011/0048164 A1 Mar. 3, 2011

(51) Int. Cl.
*F16F 15/315* (2006.01)

(52) U.S. Cl.
USPC ........................................................ 74/572.21

(58) Field of Classification Search
USPC ............ 74/433.5, 572.21, 572.2, 572.11, 74/572.12, 573.12, 573.1; 29/894, 894.33, 29/894.331, 894.332, 894.333; 310/74; 464/180; 188/378
IPC .......................................... F16F 15/30,15/315
See application file for complete search history.

(56) References Cited

U.S. PATENT DOCUMENTS

| | | | | |
|---|---|---|---|---|
| 860,336 A * | 7/1907 | Schultz | .................. | 74/572.21 |
| 3,695,780 A * | 10/1972 | Velkoff | .................. | 416/189 |
| 3,724,288 A * | 4/1973 | Jakubowski | .................. | 74/572.12 |
| 3,964,341 A * | 6/1976 | Rabenhorst | .................. | 74/572.12 |
| 3,977,273 A * | 8/1976 | Ernst et al. | .................. | 74/572.21 |
| 4,085,627 A * | 4/1978 | Losee | .................. | 74/570.1 |
| 4,123,949 A * | 11/1978 | Knight et al. | .................. | 74/572.21 |
| 4,132,130 A * | 1/1979 | Schneider | .................. | 74/572.1 |
| 4,176,563 A * | 12/1979 | Younger | .................. | 74/572.2 |
| 4,359,912 A * | 11/1982 | Small | .................. | 74/572.12 |
| 4,765,198 A * | 8/1988 | Stravrinidis | .................. | 74/572.11 |

* cited by examiner

*Primary Examiner* — Thomas Diaz

(57) ABSTRACT

An inertial energy storage rotor having a reinforcement harness encompassing its outer circumference and sides, and having improved adjustable tensioning spoke elements extending from said harness and attaches to flywheel hub. The adjustable tensioning spokes allow the harness to be evenly torqued around the perimeter and sides of the rotor to provide additional reinforcement allowing the rotor to withstand centrifugal forces higher than otherwise able.

2 Claims, 1 Drawing Sheet

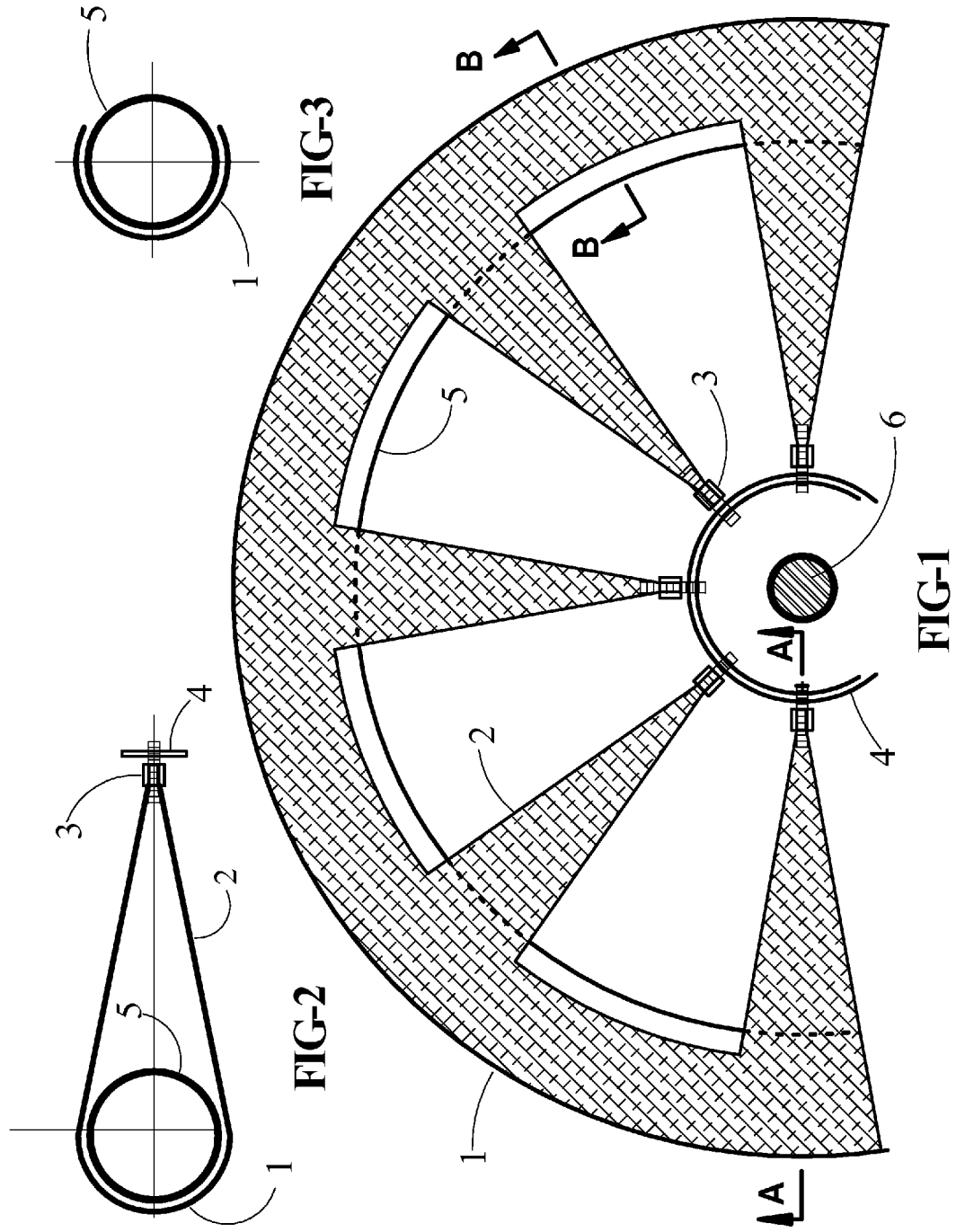

CONTAINMENT REINFORCED FLYWHEEL

TECHNICAL FIELD

The present invention relates to an inertia flywheel and its capacity to store electrical energy as kinetic energy and to recover electrical energy from the stored kinetic energy.

BACKGROUND OF INVENTION

The flywheel has long been used to store energy. It is a relatively simple device from which it is possible to store and retrieve energy readily, either by mechanical means or by using electric motors and generators. Attempts have been made to maximize the rotational inertia of the flywheel, thereby increasing the flywheel's energy storage capability by placing as much mass as possible at the outer portion of the radius or rotor. The more mass or weight of rim material required by the intended use of the flywheel, the more rigidity or strength is required to meet the loads without self-destruction of the flywheel. The present invention provides an inertia flywheel comprising a rotor contained within a partial wrap harness of suitable material terminating in a series of adjustable strap tensioners attached to a hub with a suitable tensioning nut or similar device. A wheel and axle are typically connected with spokes and/or a rim. Unlike the spokes of a wagon wheel that hold the rim away from the hub, the present invention operates similar to a bicycle or motorcycle wheel where the spokes are tensioned and torqued to pull the rim of the wheel toward the hub. The present invention creates additional strength by tensioning (pulling) the rotor toward the hub, allowing for the use of much heavier materials in the rotor and much lighter materials in the wrap harness, strap tensioners and hub. In a preferred embodiment, the rotor is liquid filled and includes suitable one-way valves such as the Variable Inertia Flywheel of U.S. patent application Ser. No. 11/833,611.

SUMMARY OF THE INVENTION

The containment-reinforced flywheel is a simple device designed to increase a flywheels energy storage capability by placing as much mass as possible at the outer portion of the radius (rotor). The containment portion of the present invention is a combination of a harness, straps, tensioners and hub designed to support the rotor when at rest and contain the rotor when rotating at a desired speed and at a desired radius while maximizing the ratio of rotor mass to the mass of the containment portion.

The containment portion of the present invention is a simple, lightweight containment where the outer harness wraps around and supports the entire outer circumference of the rotor. At desired intervals, a plurality of evenly spaced straps taper from the outer harness to adjustable tensioners attached to a hub.

BRIEF DESCRIPTION OF THE DRAWINGS

FIG. 1 shows a partial lateral view of the flywheel rotor inside the containment portion.

FIG. 2 shows a sectional view of the rotor inside the containment portion at a location through the strap along a line A-A in FIG. 1.

FIG. 3 shows a sectional view of the rotor inside the containment portion at a location between straps along a line B-B in FIG. 1.

DETAILED DESCRIPTION OF THE PREFERRED EMBODIMENTS

The containment portion of the present invention comprises an outer harness 1 that wraps around and supports the entire circumference of the flywheel rotor 5. At desired intervals, evenly spaced straps 2 taper from both sides of the outer harness 1 to adjustable tensioners 3 attached to the hub 4. The hub 4 is attached to an axle 6 or can rotate freely on a bearing around the axle 6. The adjustable tensioners 3 function in a manner similar to that of the spokes of a bicycle wheel, and can be torqued to draw the outer harness 1 tightly to the hub 4 thus containing the flywheel rotor 5. Optionally, the orientation of the tensioners 3 can be such that each strap 2 on each side of the flywheel rotor 5 has a separate tensioner 3 attached to the hub 4.

The straps 2 and harness 1 which comprise the containment portion of the present invention may be constructed of light weight materials such as sheet metal, stainless steel, titanium, polymeric materials, or other materials having the strength to contain a rotor which is spinning at the rotational speed required by the intended use of the flywheel while not adding unnecessary weight to the combination. The harness 1 surrounds the front edge and sides of the rotor 5. The straps 2 connect the harness 1 to the adjustable tensioners 3 that are positioned at intervals around hub 4.

The flywheel of the present invention comprises a rotor 5 which may be either solid or hollow, and which is drawn to the hub by the tensioning straps of the containment portion of the device. In a preferred embodiment, the flywheel rotor 5 is a hollow circular tube constructed of steel, titanium, or other metallic material; composite materials; rubber; or other materials suitable to withstand the loads and stresses of the intended use of the flywheel, but light enough to not add unnecessary weight to the combination. The interior of the flywheel rotor 5 preferably is filled with a non-corrosive liquid such as water as described in U.S. patent application Ser. No. 11/833,611 and referred to as a Variable Inertia Flywheel. The "fill ratio", that is the ratio of the fluid mass to the structural mass, determines the performance of the flywheel.

For example, a flywheel with a fill ratio of 80% spins up five times faster and stores energy 25 times faster than a conventional flywheel of the same weight and diameter. Thus the high fill ratios obtainable with the containment flywheel of the present invention result in faster spin up times and faster energy storage. Flywheel rotor 5 is mounted on axle 6 at outer hub 4.

What is claimed is:

1. An internal energy storage rotor including a central hub, the storage rotor comprising:
   (a) an outer harness (1) which encompasses the entire outer circumference and sides of said rotor (5);
   (b) a plurality of straps (2) distributed from both sides of said harness;
   (c) a plurality of adjustable tensioners (3) connecting said straps to a central hub (4);
   (d) the outer harness, straps and adjustable tensioners are each made from a material selected from a group consisting of sheet metal, stainless steel, titanium, or polymeric material;
   whereby adjustable tensioners allow outer harness to be evenly torqued from hub to outer perimeter of rotor.

2. A method of constructing a flywheel comprising:
   (a) providing an outer harness (1) which encompasses the entire outer circumference and sides of a rotor (5);

(b) providing a plurality of straps (2) distributed from both sides of said harness;
(c) providing a plurality of adjustable tensioners (3) connecting said straps to a central hub (4);
(d) the outer harness, straps and adjustable tensioners are each made from a material selected from a group consisting of sheet metal, stainless steel, titanium, or polymeric material;

whereby adjustable tensioners allow outer harness to be evenly torqued from hub to outer perimeter of rotor.

* * * * *